US012742735B2

(12) United States Patent
Yune

(10) Patent No.: US 12,742,735 B2
(45) Date of Patent: Sep. 22, 2026

(54) DEVICE AND METHOD FOR MATERIAL ANALYSIS USING MICROFLUIDICS, MACHINE VISION, AND LASER-INDUCED BREAKDOWN SPECTROSCOPY

(71) Applicant: SDT Inc., Seoul (KR)

(72) Inventor: Jiwon Yune, Gwacheon-si (KR)

(73) Assignee: SDT INC., Seoul (KR)

( * ) Notice: Subject to any disclaimer, the term of this patent is extended or adjusted under 35 U.S.C. 154(b) by 28 days.

(21) Appl. No.: 18/653,489

(22) Filed: May 2, 2024

(65) Prior Publication Data

US 2024/0369492 A1 Nov. 7, 2024

(30) Foreign Application Priority Data

May 3, 2023 (KR) ........................ 10-2023-0058006

(51) Int. Cl.
*G01N 21/71* (2006.01)
*G06V 20/69* (2022.01)

(52) U.S. Cl.
CPC ......... *G01N 21/718* (2013.01); *G06V 20/693* (2022.01)

(58) Field of Classification Search
CPC ......... G01N 21/718; G01N 2021/0346; G01N 2021/035; G01N 21/05; G01N 33/2835; G06V 20/693; B01L 2200/0673; B01L 2300/0816; B01L 2300/0867; B01L 3/502715; B01L 3/502784
See application file for complete search history.

(56) References Cited

U.S. PATENT DOCUMENTS

| | | | | |
|---|---|---|---|---|
| 6,120,666 | A * | 9/2000 | Jacobson | G01N 27/44773 204/603 |
| 7,084,963 | B2 * | 8/2006 | Leipertz | F01N 1/00 356/73 |
| 10,113,952 | B2 * | 10/2018 | Washburn | G01N 29/2418 |
| 10,324,039 | B2 * | 6/2019 | Walls | G01N 33/2823 |
| 2003/0234210 | A1 * | 12/2003 | Deshpande | F16K 99/0028 209/581 |
| 2004/0066703 | A1 * | 4/2004 | Sparey-Taylor | B01J 19/0093 366/127 |

(Continued)

FOREIGN PATENT DOCUMENTS

| | | |
|---|---|---|
| KR | 10-2021-0031217 A | 3/2021 |
| KR | 10-2021-0056974 A | 5/2021 |
| WO | WO 2016/139386 A1 | 9/2016 |

OTHER PUBLICATIONS

A Novel Platform for High-Speed, High-Resolution LIBS Imaging to Harrel et al., Photonic Instrumentation Engineering X, edited by Lynda E. Busse, Yakov Soskind, Proc. of SPIE vol. 12428; (May 2023).*

(Continued)

*Primary Examiner* — Mohamed K Amara
(74) *Attorney, Agent, or Firm* — Birch, Stewart, Kolasch & Birch, LLP

(57) ABSTRACT

Disclosed is an analysis device including a microfluidic chip that generates a droplet, a machine vision that captures a first point of the microfluidic chip, and a LIBS module that irradiates a second point of the microfluidic chip with laser. When a droplet is detected in an image captured by the machine vision, the LIBS module is driven to irradiate laser. The first point and the second point are points where the generated droplet can be observed.

20 Claims, 8 Drawing Sheets

(56) References Cited

U.S. PATENT DOCUMENTS

| | | | | |
|---|---|---|---|---|
| 2005/0103690 | A1* | 5/2005 | Kawano | B01L 3/502784 209/128 |
| 2006/0088929 | A1* | 4/2006 | Nakajima | F04B 43/046 435/288.5 |
| 2006/0278288 | A1* | 12/2006 | Gilbert | F16K 99/0019 137/827 |
| 2009/0290151 | A1* | 11/2009 | Agrawal | G01N 21/03 378/47 |
| 2010/0018584 | A1* | 1/2010 | Bransky | B01L 3/502792 137/831 |
| 2010/0126922 | A1* | 5/2010 | Takahashi | B01D 21/283 210/201 |
| 2012/0174650 | A1* | 7/2012 | Ariessohn | B03C 3/017 73/23.2 |
| 2014/0022531 | A1* | 1/2014 | Sackett | G01J 3/2803 356/402 |
| 2014/0375991 | A1* | 12/2014 | Schneider | G01N 31/16 356/326 |
| 2017/0191940 | A1* | 7/2017 | Sabsabi | G01N 21/718 |
| 2017/0234800 | A1* | 8/2017 | Zhou | G01J 3/443 356/36 |
| 2018/0164273 | A1* | 6/2018 | Sieben | G01N 21/31 |
| 2019/0079019 | A1* | 3/2019 | Sobron | G01J 3/443 |
| 2019/0170617 | A1* | 6/2019 | Nikolajsen | G01N 1/44 |
| 2021/0407700 | A1 | 12/2021 | Honda et al. | |
| 2022/0044921 | A1 | 2/2022 | McLoughlin et al. | |
| 2023/0101936 | A1* | 3/2023 | Rajwa | G01N 21/718 702/19 |
| 2024/0337600 | A1* | 10/2024 | Yune | G01N 21/718 |

OTHER PUBLICATIONS

Godwall et al., "Elemental analysis using micro Laser-induced Breakdown Spectroscopy (μLIBS) in a microfluidic platform," Optics Express, vol. 16, No. 17, Aug. 18, 2008, pp. 12435-12445.

Ikezawa et al., "Sensing System for Multiple Measurements of Trace Elements Using Laser-Induced Breakdown Spectroscopy," IEEJ Transactions on Sensors and Micromachines [online], vol. 129, No. 4, 2009, 7 pages total.

Ikezawa et al., "Ultratrace Measurement Using Micro-droplet With Gas-flow Assistance in Laser-induced Breakdown Spectroscopy," IEEE Sensors 2008 Conference, IEEE, 2008, pp. 977-980.

Janzen et al., "Analysis of small droplets with a new detector for liquid chromatography based on laser-induced breakdown spectroscopy," Elsevier, Spectrochimica Acta Part B, vol. 60, No. 7-8, Aug. 31, 2005, pp. 993-1001.

Sengupta et al., "Lab-on-a-chip sensing devices for biomedical applications," Bioelectronics and Medical Devices, 2019, pp. 47-95.

Ikezawa et al., "Ultratrace Measurement Using Micro-droplet With Gas-flow Assistance in Laser-induced Breakdown Spectroscopy," IEEE, XP31375243Al, 2008, pp. 977-980.

Janzen et al., "Analysis of small droplets with a new detector for liquid chromatography based on laser-induced breakdown spectroscopy," Elsevier, Spectrochimica ActA Part B, XP5090146Al, vol. 60, 2005, pp. 993-1001.

Sengupta et al., "Lab-on-a-chip sensing devices for biomedical applications", Bioelectronics and Medical Devices, 2019, XP55714362Al, pp. 47-95.

* cited by examiner

[Fig. 3A]
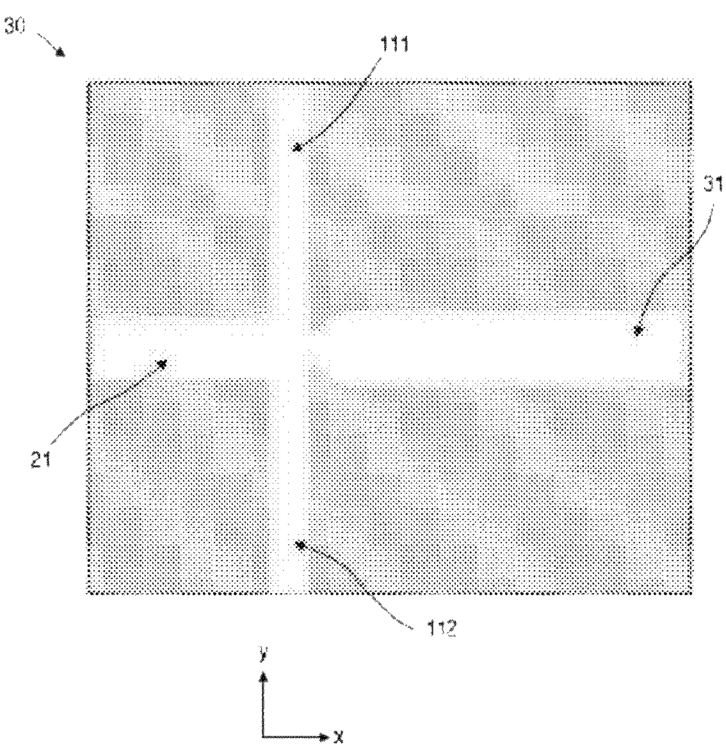

[Fig. 6]
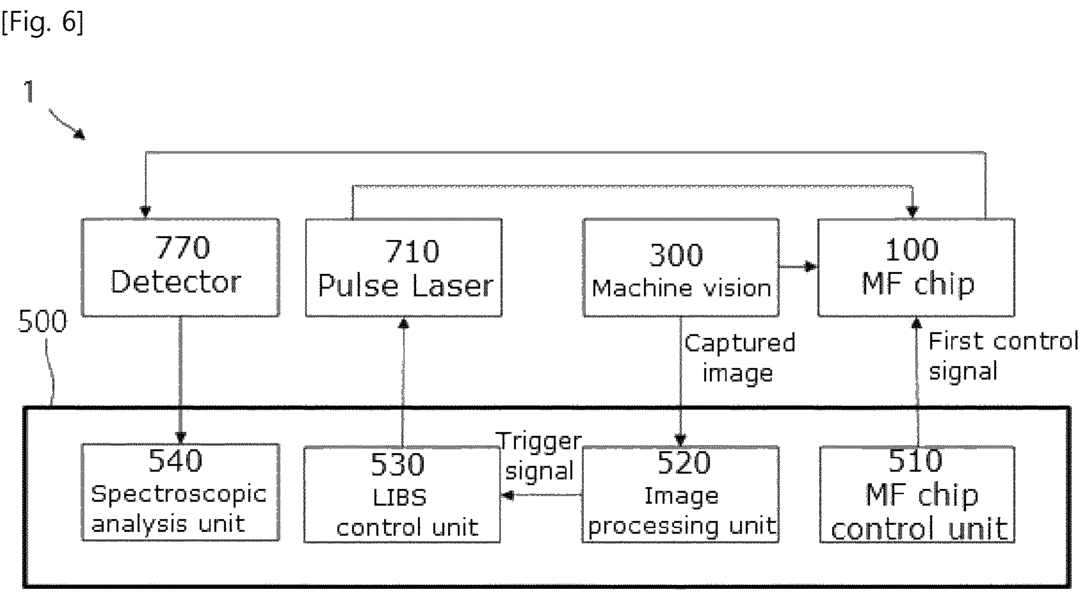
[Fig. 7]
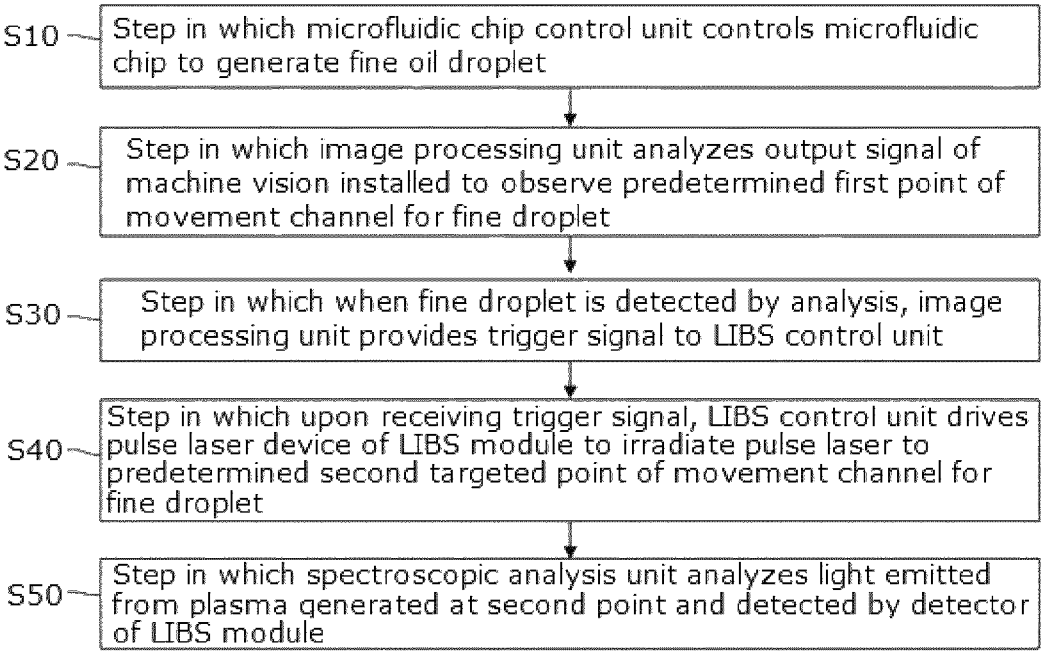

DEVICE AND METHOD FOR MATERIAL ANALYSIS USING MICROFLUIDICS, MACHINE VISION, AND LASER-INDUCED BREAKDOWN SPECTROSCOPY

CROSS-REFERENCE TO RELATED APPLICATIONS

This application claims priority to and the benefit of Korean Patent Application No. 10-2023-0058006 filed in the Korean Intellectual Property Office on May 3, 2023, the entire contents of which are incorporated herein by reference.

TECHNICAL FIELD

The present invention relates to a device for analyzing components of a material, and particularly to a technology using microfluidics, machine vision, and laser induced breakdown spectroscopy (LIBS).

BACKGROUND ART

<Microfluidics>

Microfluidics are a field of science and engineering that deals with behavior, control, and manipulation of liquids confined in small volumes (usually microliter ($10^{-6}$ liter) or nanoliter ($10^{-9}$ liter) level). Microfluidic devices and systems are designed to operate in the small volumes, and often use channels, chambers and other structures on the scale of micrometers ($10^{-6}$ meters). Microfluidics is applied in various fields such as chemistry, biology, medicine, and engineering. In chemistry, microfluidic devices can be used for chemical synthesis, analysis, and separation. In biology and medicine, microfluidic devices can be used in cell analysis, drug discovery, and diagnostic testing. In engineering, microfluidic devices can be used in microelectromechanical systems (MEMS), microreactors and microfluidic chips. One of the main advantages of microfluidics is the ability to precisely control and manipulate liquids and their properties at the microscale. This can lead to improvements in efficiency, sensitivity and speed in a variety of applications.

Microfluidic chips, also known as lab-on-a-chip or microfluidic devices, are each a compact device that integrates multiple laboratory functions and analysis processes into a single chip. The microfluidic chips are designed to manipulate and analyze liquids at the microscale level by using channels, chambers and other structures on the scale of micrometers ($10^{-6}$ meters). The microfluidic chips can be made of a variety of materials, including silicon, glass, and polymer plastics. The microfluidic chips can be used in a variety of applications, including biological analysis, point-of-care diagnostics, and environmental monitoring. One of the main advantages of the microfluidic chips is the ability to perform complex laboratory functions with small amounts of samples and reagents, reducing the time and cost required for analysis. Overall, the microfluidic chips have the potential to transform laboratory analysis methods by enabling fast, efficient and cost-effective analysis of complex samples.

<Machine Vision>

Machine vision belongs to a field of artificial intelligence and computer science, and is a technology of enabling a computer to interpret and analyze digital images and videos. Various techniques and algorithms are used to extract meaningful information from visual data. Machine vision can be applied to various fields such as object recognition, image analysis, pattern recognition, face recognition, and optical character recognition. Machine vision systems generally use cameras and sensors to capture visual data, which is processed by specialized software to identify patterns, shapes, colors and other features. These systems operate in real time or near real time, enabling fast and accurate analysis of visual data.

<LIBS>

Laser Induced Breakdown Spectroscopy (LIBS) is one of analytical techniques used to determine an elemental constitution of a sample. In LIBS, high-energy laser pulses are used to generate plasma of a sample object and analysis is performed using spectroscopy. The analysis process begins by focusing a high-energy laser beam on a sample surface, causing some of the object to vaporize and to form plasma. This plasma emits light at various wavelengths, which can be then captured and analyzed using a spectrometer. Since each element in a sample emits light at a unique set of wavelengths, the constitution of the sample can be determined by identifying a specific spectral line emitted by each element. LIBS has several advantages over other elemental analysis techniques. LIBS is non-destructive because it can enable analysis without deforming or destroying the sample. In addition, a result is obtained relatively quickly, typically within seconds to minutes. LIBS can also be used to analyze samples in various states, including solids, liquids, and gases. LIBS is widely used in fields such as environmental analysis, materials science, and industrial process control. In particular, LIBS is suitable for cases where sample preparation or transportation is difficult, and is very useful because only a small amount of objects is required and large sample preparation is not required.

The main configurations of LIBS are as follows. LIBS uses a high-power laser to generate plasma from a sample. Laser energy is focused on the sample, causing an object to be removed and vaporized. The laser-induced plasma contains ions and atoms generated from the sample. They emit characteristic light when returning to the ground state. By analyzing this light, the elemental constitution of the sample can be determined. LIBS uses a spectrometer to collect and analyze light emitted from plasma. The light is split into its component wavelengths, and the intensity of each wavelength is measured. LIBS uses a detector to measure the intensity of light emitted from the plasma at each wavelength. The detector usually consists of a CCD camera or photomultiplier tube. LIBS uses a calibration curve to relate the intensity of the emitted light to an elemental concentration in the sample. The calibration curve is constructed by analyzing a sample of known constitution under the same experimental conditions as the sample to be analyzed. The sample to be analyzed should be properly prepared for accurate and precise measurement. To this end, the uniformity of the sample should be maintained by polishing or grinding the sample and using a sample holder or matrix.

LIBS has the following characteristics. LIBS can quickly analyze a sample within seconds, making it useful for massive analysis. Since LIBS is a non-destructive analytical technique that does not destroy a sample, it is especially important when analyzing valuable or irreplaceable samples. LIBS is a technique with high sensitivity that can detect trace elements in a sample, so it can be usefully utilized in various fields such as environmental monitoring, industrial process control, and forensic analysis. LIBS is a technique that can analyze various materials such as metals, minerals, ceramics, polymers, and biological tissues. LIBS requires minimal sample preparation, which saves time and reduces the risk of sample contamination. LIBS systems can be designed with portability in mind and are useful for on-site analysis or field measurements. LIBS can detect and quantitatively analyze multiple elements in one analysis. LIBS can quantitatively analyze the elemental constitution of a sample, making it useful in various fields such as quality control and process optimization.

To generate a laser beam in LIBS, a laser cavity, a pump source, a Q-switch, an optical device, and control electronics may be included. The laser cavity is a key component that generates a laser beam, and may include two mirrors, an active medium (such as gas or crystal), and a power source that supplies energy to the active medium. The pump source is an element that provides energy to the active medium of the laser cavity, and may be a flash lamp, a diode laser, or another laser that emits light at a specific wavelength corresponding to an absorption spectrum of the active medium. The Q-switch is a device that controls timings of laser pulses and generates high-energy pulses by quickly switching the cavity between two states. The optical device is a continuum of a lens and a mirror and is used to shape and focus the laser beam. The optical device helps control the duration and energy of the laser pulse. The control electronics regulate the power and timing of the laser pulses, ensuring that the laser produces stable and consistent results.

The optical device may include a focusing optic, an emission light collection optical device, a spectrometer, and a detector. The focusing optic is used to focus the laser beam on the sample. The optical device may include a lens, a mirror, or a combination of the lens and the mirror to achieve a desired spot size. The emission light collection optical device is used to collect light emitted from the plasma and includes a lens and a mirror to focus and guide the light to the spectrometer. The spectrometer is used to analyze the light emitted from the plasma, splitting the light into component wavelengths and measuring the intensity of each wavelength. The detector is used to measure the intensity of light emitted by the plasma at each wavelength, and the detector may be a CCD camera or a photomultiplier tube.

FIG. 1 is a diagram showing an operating principle of a laser-induced spectroscopic analyzer.

A laser-induced spectroscopic analyzer 7 may include a pulse laser 710, a mirror 720, a focusing optic 230, an emission light collection optical device 240, a light collector 750, a spectrometer 760, and a detector 770. The focusing optic 230 may include a focusing lens 730 and a first collimator, and the emission light collection optical device 240 may include a collection lens 740 and a second collimator.

In the present specification, the laser-induced spectroscopic analyzer 7 may be referred to as LIBS 7, or LIBS module 7.

A pulse laser irradiated by the pulse laser 710 is provided to the focusing lens 730 through the mirror 720. The focusing lens 730 may be arranged to focus the pulse laser on a surface of a sample 800 to be analyzed. The pulse laser passing through the focusing lens 730 may generate plasma 810 of the sample 800. Light of various wavelengths emitted from the plasma 810 may pass through the collection lens 740, the light collector 750, and the spectrometer 760 and be split. Lights of split wavelengths can be detected by the detector 770. In the present specification, the pulse laser 710 may be referred to as the laser generator 710.

LIBS can be used for crude oil analysis. Crude oil is a complex mixture of hydrocarbons with different compositions depending on petroleum supply sources. Crude oil component analysis is important in a variety of applications, including petroleum exploration, refining, and environmental monitoring. According to the related art for crude oil component analysis, there is a problem of increases in time and cost because crude oil should be separated into constitutional components.

In addition, LIBS can be used to analyze not only crude oil but also other types of oil, powdery substances such as fine dust, and substances such as radioactive elements dissolved in the cooling water of nuclear power plants.

The inventors of this patent application developed a technique of generating an aerosol in which analyte (e.g., oil) and water are mixed and analyzing the generated aerosol using LIBS. In this case, an amount of analyte enough to generate the aerosol should be prepared. If an amount of prepared analyte is not sufficient, there is a problem in that the aerosol cannot be generated.

SUMMARY OF THE INVENTION

The present invention has been made in an effort to provide a technique that allows for analysis of oil components by using only an oil sample prepared in a small amount.

An exemplary embodiment of the present invention provides an analysis device including a microfluidic chip 100 configured to generate a droplet; a machine vision 300 configured to capture a first point of the microfluidic chip; and a LIBS module 7 configured to irradiate a second point of the microfluidic chip with laser, wherein when a droplet is detected in an image captured by the machine vision, the LIBS module is driven to irradiate laser, and wherein the first point and the second point may be points where the generated droplet can be observed.

In an exemplary embodiment, the droplet may be a droplet containing oil.

Alternatively, the droplet may be a droplet containing crude oil.

Alternatively, the droplet may be a droplet containing moisture.

In an exemplary embodiment, the first point and the second point may be the same point.

In an exemplary embodiment, the first point or the second point may be a point on a second flow path 21 through which the generated droplet moves.

In an exemplary embodiment, the first point or the second point may be a fine droplet channel 40 in which the generated droplet is accumulated.

Alternatively, the first point and the second point may be different points, a first droplet present at the first point at a first time point may be located at the second point at a second time point, the first time point may be a time point when the machine vision captures the first droplet, and the second time point may be a time point when the LIBS module irradiates the laser in response to the image captured by the machine vision at the first time point.

In an exemplary embodiment, the analysis device may further include a microfluidic chip control unit 510 configured to control a generation speed of the droplet generated in the microfluidic chip and a movement speed of the droplet within the microfluidic chip.

In an exemplary embodiment, the analysis device may further include an image processing unit 520 configured to analyze the captured image output by the machine vision and to generate a trigger signal when a droplet is present in the captured image; and a LIBS control unit 530 configured to control the LIBS module to irradiate the laser upon input of the trigger signal.

According to the present invention, it is possible to provide a technique that allows for analysis of oil components by using only an oil sample prepared in a small amount.

BRIEF DESCRIPTION OF THE DRAWINGS

FIG. 3A is an enlarged view of a joining region of components of the microfluidic chip shown in FIG. 2.

FIG. 6 is a diagram showing a flow of control signals and detection signals output by each component of the material analysis device provided according to an exemplary embodiment of the present invention.

FIG. 7 is a flow chart showing a material analysis method provided according to an exemplary embodiment of the present invention.

DETAILED DESCRIPTION

Hereinafter, exemplary embodiments of the present disclosure will be described with reference to the accompanying drawings. However, the present invention is not limited to the exemplary embodiments described herein and may be implemented in various other forms. The terms used in the present specification are intended to help understanding of the exemplary embodiments and are not intended to limit the scope of the present invention. In addition, singular forms used herein are intended to include the plural forms as long as phrases do not clearly indicate an opposite meaning.

Figure 1:
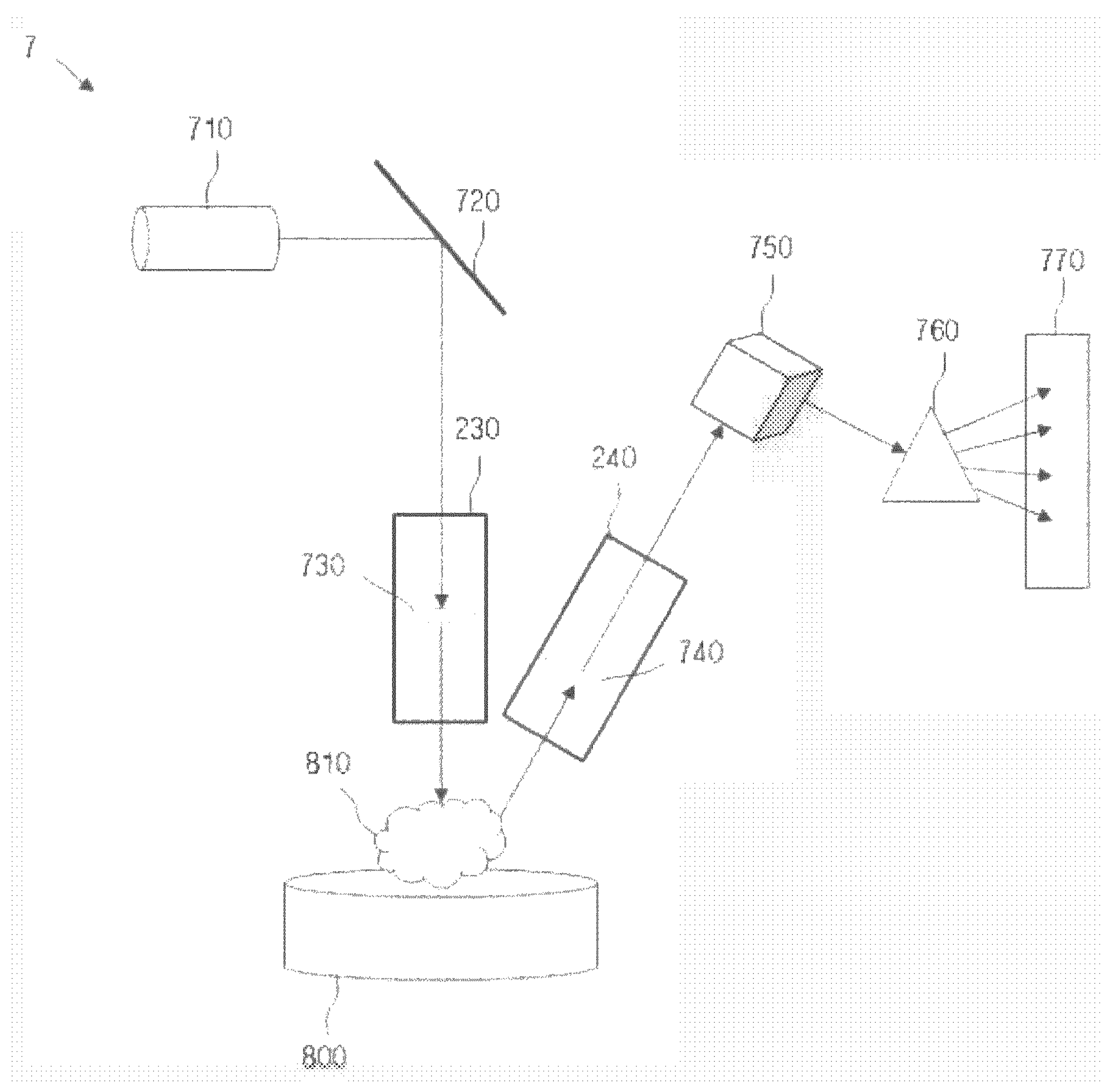
FIG. 1 is a diagram showing an operating principle of a laser-induced spectroscopic analyzer.
Figure 2:
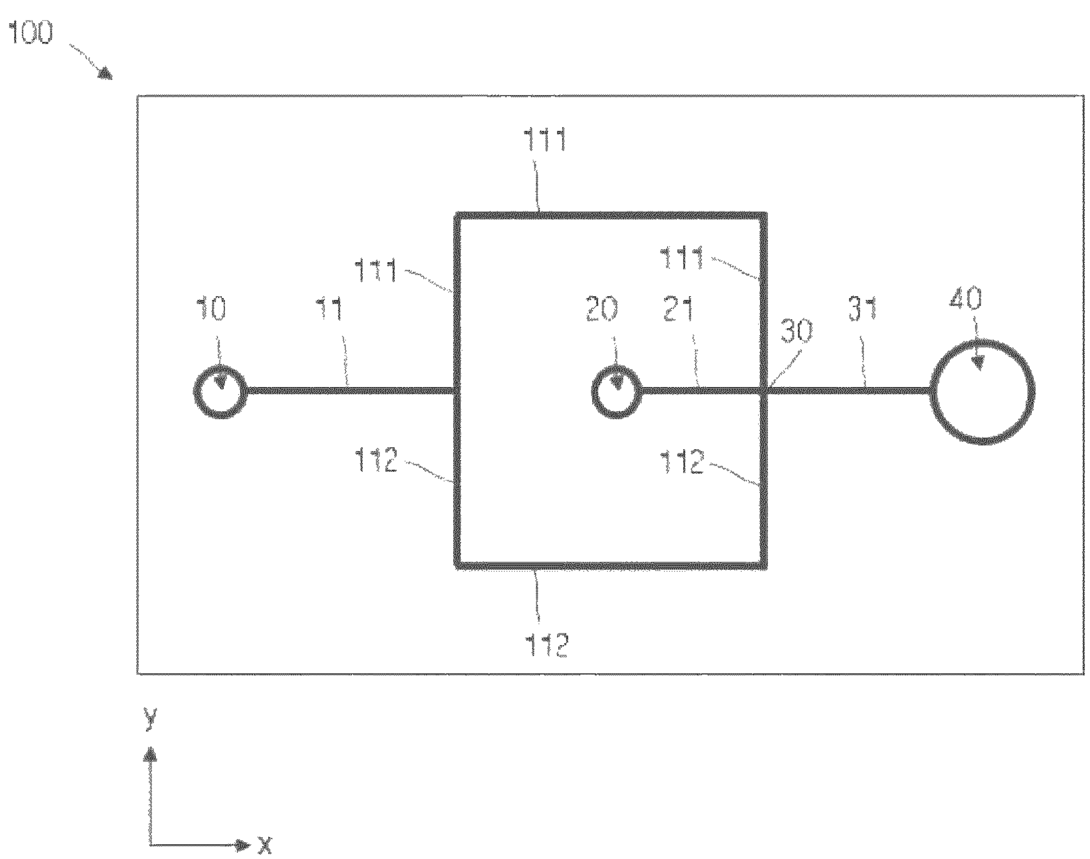
FIG. 2 shows a configuration of a microfluidic chip used in a material analysis device according to an exemplary embodiment of the present invention.

FIG. 2 shows a configuration of a microfluidic chip 100 used in a material analysis device according to an exemplary embodiment of the present invention.

FIG. 3A is an enlarged view of a joining region of components of the microfluidic chip shown in FIG. 2.

Figure 3B:
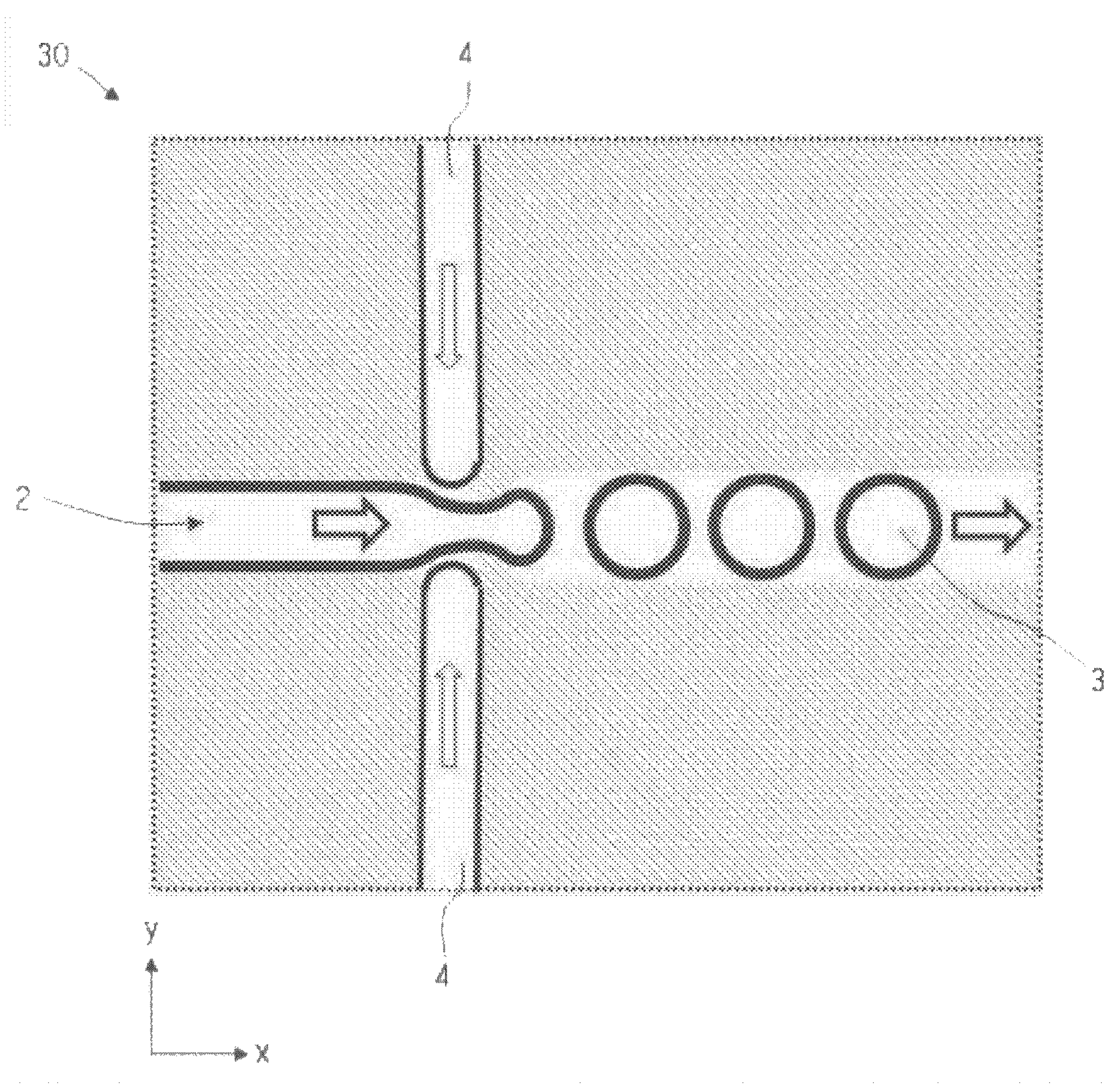
FIG. 3B shows a phenomenon that occurs in the joining region shown in FIG. 3A.

FIG. 3B shows a phenomenon that occurs in the joining region shown in FIG. 3A.

Figure 3C:
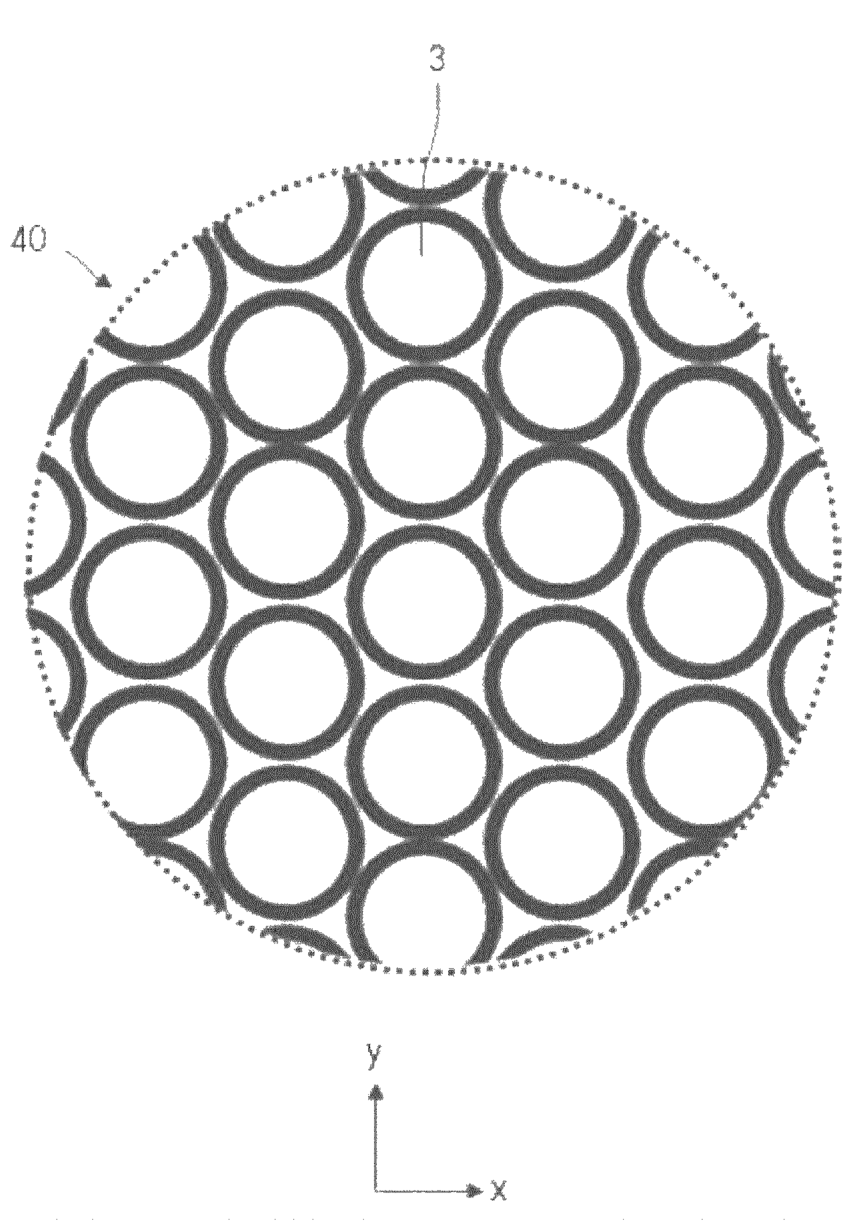
FIG. 3C shows a state in which oil droplets are gathered in a fine droplet channel of the components of the microfluidic chip shown in FIG. 2.

FIG. 3C shows a state in which oil droplets are gathered in a fine droplet channel of the components of the microfluidic chip shown in FIG. 2.

The description will be given below with reference to FIGS. 2, 3*a*, 3*b*, and 3*c*.

The microfluidic chip 100 is a device in the form of a thin plate, and is formed with fine flow paths through which fluid can move.

The microfluidic chip 100 is formed with a first flow path 11, a first branch flow path 111, a second branch flow path 112, a second flow path 21, and a third flow path 31.

The third flow path 31 may also be referred to as a droplet flow path 31.

A water inlet 10 through which water can be supplied to the first flow path 11 is formed at one end portion of the first flow path 11. The water inlet 10 may be equipped with a water supply tube through which water can be supplied.

The water inlet 10 may also be referred to as a first fluid inlet 10.

One end portion of the first branch flow path 111 and one end portion of the second branch flow path 112 are connected to the other end portion of the first flow path 11. Water supplied through the water inlet 10 may move through the first flow path 11, the first branch flow path 111, and the second branch flow path 112.

An oil inlet 20 through which oil can be supplied to the second flow path 21 is formed at one end portion of the second flow path 21. The oil inlet 20 may be equipped with an oil supply tube through which oil can be supplied.

The oil inlet 20 may also be referred to as a second fluid inlet 20.

The oil may be, for example, a sample of crude oil. Alternatively, the oil may be a sample of other types of vegetable oil, animal oil, synthetic oil, and industrial oil other than crude oil.

The other end portion of the second flow path 21, the other end portion of the first branch flow path 111, the other end portion of the second branch flow path 112, and one end portion of the third flow path 31 may be connected to one another in a joining region 30.

Oil supplied through the oil inlet 20 may move to a fine droplet channel 40 through the second flow path 21 and the third flow path 31.

The fine droplet channel 40 may also be referred to as a droplet reservoir 40.

In this case, oil 2 moving from the second flow path 21 toward the third flow path 31 may be split and deformed into droplets in the joining region 30 by a bidirectional pressure of water 4 exerting pressure from the first branch flow path 111 and the second branch flow path 112 toward the joining region 30. That is, the water 4 in the first branch flow path 111 may exert pressure in the −y axis direction toward the joining region 30, and the water 4 in the second branch flow path 112 may exert pressure in the +y axis direction toward the joining region 30. As a result, the oil moving through the third flow path 31 may be composed of a plurality of separate droplets 3.

The two types of fluids provided in the microfluidic chip used in the present invention are not limited to water and oil. The material moving from the second flow path 21 toward the third flow path 31 may be any second fluid rather than the oil, and the material exerting pressure from the first branch flow path 111 and the second branch flow path 112 toward the joining region 30 may be any first fluid rather than the water. In this case, if the second fluid can be split and deformed into droplets by the bidirectional pressure of the first fluid exerting pressure toward the joining region 30, any second fluid may become a target that is subjected to material analysis using the present invention. A person who uses the material analysis device of the present invention can select any first fluid and any second fluid. In this case, physical properties and/or chemical characteristics of any first fluid and any second fluid may be considered.

The droplets 3 may gather in the fine droplet channel 40. A tube for extracting the droplets 3 may be connected to the fine droplet channel 40.

Amounts and supply speeds of water and oil provided through the water supply tube and the oil supply tube may be controlled by a microfluidic chip control unit (MF chip control unit) 510 that controls operations of the microfluidic chip 100.

Figure 4:
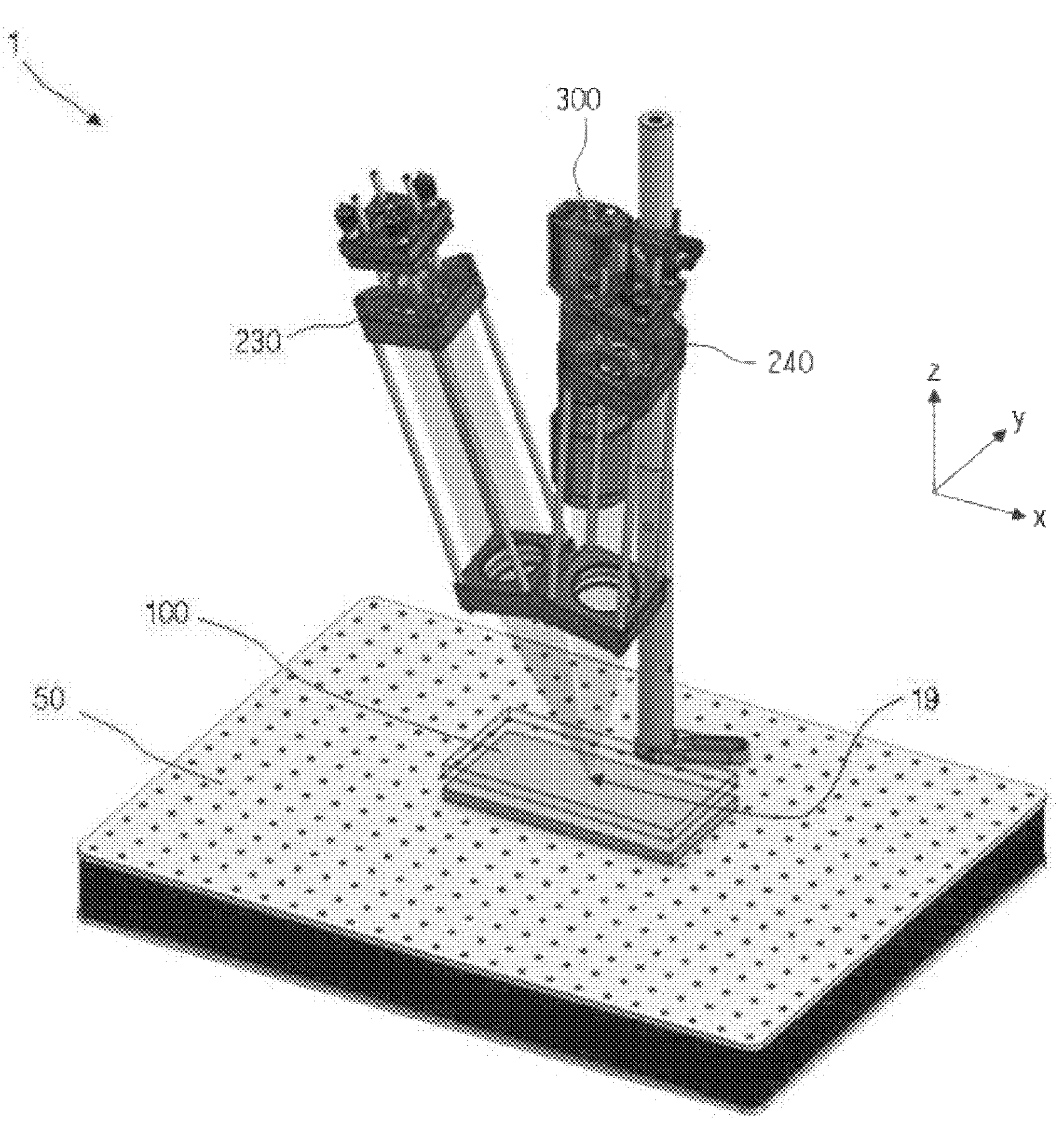
FIG. 4 is a perspective view showing a configuration of a material analysis device provided according to an exemplary embodiment of the present invention.

FIG. 4 is a perspective view showing a configuration of a material analysis device provided according to an exemplary embodiment of the present invention.

A material analysis device 1 may include a stage 50 on which the microfluidic chip 100 can be mounted, a LIBS module 7 adapted to irradiate laser toward an observation spot 19, which is a specific point of the microfluidic chip 100 mounted on the stage 50, and to analyze emission light of plasma generated as a result of interaction of the laser with a sample of the microfluidic chip 100, a machine vision 300 for observing the observation spot 19, and a control device for controlling them.

In the present specification, the material analysis device 1 may also be referred to as an analysis device 1.

For convenience of description, only the focusing optic 230 and the emission light collection optical device 240 of the LIBS module 7 are shown in FIG. 4.

Figure 5A:
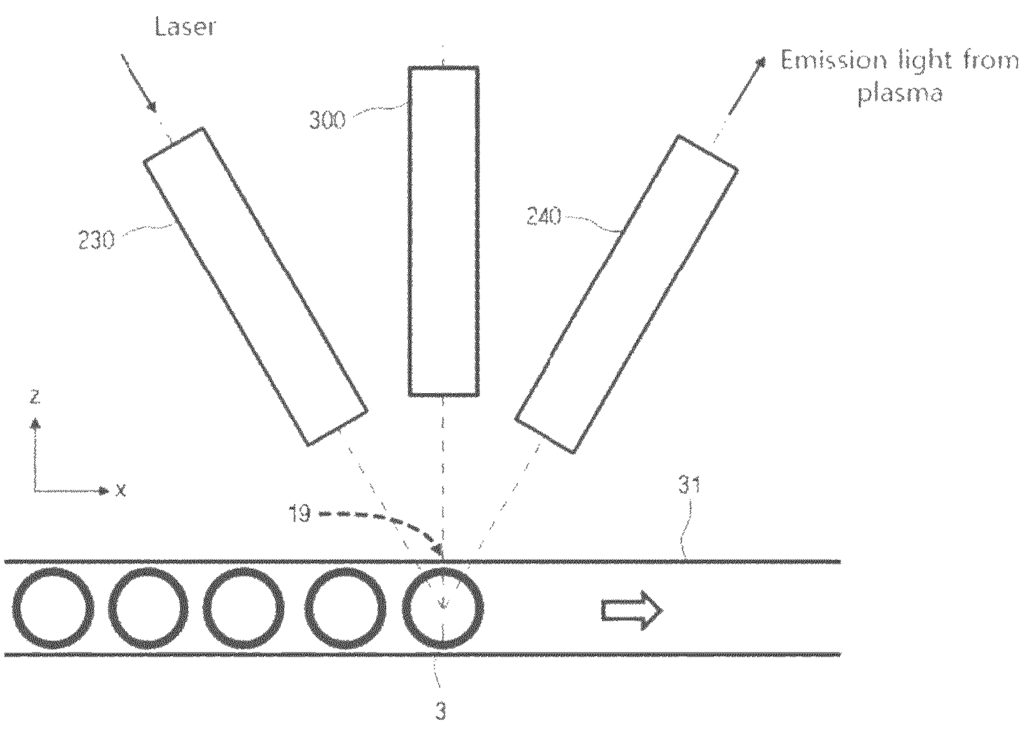
FIG. 5A is presented to illustrate a phenomenon that occurs at an observation spot of the material analysis devices shown in FIG. 4.

FIG. 5A is presented to illustrate a phenomenon that occurs at an observation spot of the material analysis devices shown in FIG. 4.

The observation spot 19 may be one point of the third flow path 31.

When water and oil are supplied to the microfluidic chip 100 to generate oil droplets 3, the droplets 3 may move along the third flow path 31 in the x direction.

When a droplet is found at the observation spot 19 while observing the observation spot 19, the machine vision 300 may generate a trigger signal that enables the LIBS module 7 to irradiate the observation spot 19 with the laser, and provide the trigger signal to the control unit of the LIBS module 7.

The machine vision 300 may not generate the trigger signal in a state where no droplet is found at the observation spot 19.

The LIBS module 7 may be adapted to output the laser only when the trigger signal is generated.

The focusing optic 230 of the LIBS module 7 may be adapted to focus the laser on the droplet 3 present at the observation spot 19.

In this case, when the laser and the droplet 3 at the observation spot 19 react with each other, plasma may be formed at the observation spot 19. Light emitted from the plasma may be collected and analyzed by the emission light collection optical device 240 of the LIBS module 7.

Figure 5B:
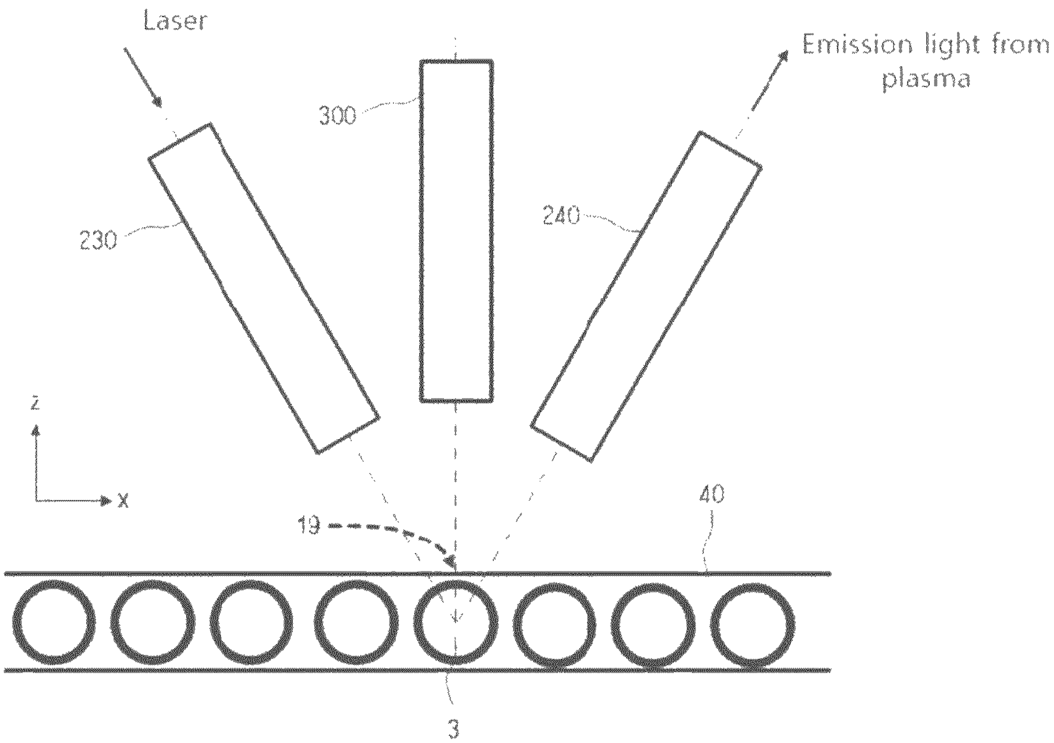
FIG. 5B shows a case where the observation spot is present in the fine droplet channel.

FIG. 5B shows a case where the observation spot is present in the fine droplet channel.

FIG. 5A shows a case where the observation spot 19 is set to one point of the third flow path 31, but FIG. 5B shows a case where the observation spot 19 is set to one point of the fine droplet channel 40.

FIG. 6 is a diagram showing a flow of control signals and detection signals output by each component of the material analysis device provided according to an exemplary embodiment of the present invention.

The material analysis device 1 may include a control unit 500 that processes input signals and output signals with respect to various components included in the material analysis device 1. The control unit 500 may be a digital signal processing device including a processor and/or an FPGA.

The control unit 500 may include a microfluidic chip control unit (MF chip control unit) 510, an image processing unit 520, a LIBS control unit 530, and a spectroscopic analysis unit 540.

In an exemplary embodiment, the spectroscopic analysis unit 540 may be a component implemented in a separate computing device from the control unit 500.

The microfluidic chip control unit 510 may provide a first control signal for controlling an operation of the microfluidic chip 100 to the microfluidic chip 100. A pattern in which oil droplets are generated in the microfluidic chip 100 may be adjusted by the first control signal.

The machine vision 300 may provide a captured image of the observation spot 19 to the image processing unit 520.

The image processing unit 520 may generate a predetermined trigger signal and provide the same to the LIBS control unit 530 when a droplet is observed in the captured image. The trigger signal may be a pulse with a predetermined duration.

In an exemplary embodiment, the trigger signal may be periodically generated and provided while the droplet is observed in the captured image.

When no droplet is observed in the captured image, the image processing unit 520 may not generate the trigger signal.

The LIBS control unit 530 may control the pulse laser 710 to emit laser for a predetermined time when receiving the trigger signal. The laser may be pulsed laser.

When the laser emitted by the pulse laser 710 reacts with oil droplets present at the observation spot 19 of the microfluidic chip 100, plasma may be generated near the observation spot 19.

Light emitted from the plasma may be detected by the detector 770 and provided to the spectroscopic analysis unit 540.

An output result provided by the spectroscopic analysis unit 540 may be used to determine components of the oil forming droplets in the microfluidic chip 100.

FIG. 7 is a flow chart showing a material analysis method provided according to an exemplary embodiment of the present invention.

In step S10, the microfluidic chip control unit 510 may control the microfluidic chip 100 to generate a fine oil droplet 3 on the microfluidic chip 100.

In step S20, the image processing unit 520 may analyze a captured image, which is an output signal of the machine vision 300 installed to observe a predetermined first point of the movement channel 31 or 40 for the fine droplet 3.

In step S30, when the fine droplet 3 is detected by the analysis, the image processing unit 520 may provide a trigger signal to the LIBS control unit 530.

In step S40, upon receiving the trigger signal, the LIBS control unit 530 may drive a pulse laser device of the LIBS module 7 to irradiate the pulse laser to a predetermined second targeted point of the movement channel for the fine droplet.

In step S50, the spectroscopic analysis unit 540 may analyze light emitted from plasma generated at the second point and detected by the detector 770 of the LIBS module 7.

In an exemplary embodiment, both the first point and the second point may be the observation spot 19. In this present exemplary embodiment, a time interval from a first time point when the machine vision 300 generates a captured image to a second time point when the laser is irradiated to the microfluidic chip 100 is very short, so a situation is assumed in which the droplet substantially stays as is at the observation spot 19 from the first time point to the second time point.

In another exemplary embodiment, the first point may be the observation spot 19, and the second point may be a point spaced apart from the observation spot 19 by a predetermined distance. In this exemplary embodiment, a situation is assumed in which the droplet moves from the first point to the second point during a time period from the first time point when the machine vision 300 generates a captured image to the second time point when the laser is irradiated to the microfluidic chip 100.

In another exemplary embodiment, the second point may be the observation spot 19, and the first point may be a point spaced apart from the observation spot 19 by a predetermined distance. In this exemplary embodiment, a situation is assumed in which the droplet moves from the first point to the second point during a time period from the first time point when the machine vision 300 generates a captured image to the second time point when the laser is irradiated to the microfluidic chip 100.

In the above description, the droplet has been exemplified as the oil droplet, but the droplet is not limited to the oil droplet. For example, the droplet may be selected from various sources, such as crude oil droplet or water droplet.

In the above description, the reference numbers 10 and 20 are described as the water inlet and the oil inlet, respectively, but are not limited thereto. That is, any combination of materials that can generate droplets is possible. For example, the reference numbers 10 and 20 may be an oil inlet and a water inlet, respectively. Additionally, materials other than water and oil may also be applied corresponding to the reference numbers 10 and 20. Therefore, the reference numbers 10 and 20 may also be referred to as a first fluid inlet and a second fluid inlet, respectively.

By using the above-described exemplary embodiments of the present invention, those who belong to the technical field of the present invention will be able to easily perform various changes and modifications without departing from essential characteristics of the present invention. Contents of each claim of the claims may be combined with another claim that does not have a citation relationship within a range that may be understood through the present specification.

REFERENCE SIGNS LIST

1: material analysis device
3: droplet
10: water inlet, first fluid inlet
19: observation spot
20: oil inlet, second fluid inlet
30: joining region
31: third flow path, droplet flow path
40: fine droplet channel, droplet reservoir
100: microfluidic chip
230: focusing optic
240: emission light collection optical device
300: machine vision
510: microfluidic chip control unit
520: image processing unit
530: LIBS control unit
540: spectroscopic analysis unit

What is claimed is:

1. An analysis device comprising:
a microfluidic chip configured to generate a droplet, and comprising:
a first fluid inlet configured to supply a first fluid to a first flow path;
a branch disposed at an end of the first flow path, the branch forming at least a first branch flow path and a second branch flow path configured to carry the first fluid;
a second fluid inlet configured to supply a second fluid to a second flow path;
a joining region disposed at an end of the first branch flow path, an end of the second branch flow path, and an end of the second flow path such that the droplet is generated by the first fluid and the second fluid joining at the joining region, the generated droplet comprising the second fluid; and
a third flow path configured to carry the generated droplet;
a machine vision configured to capture images of a first point of the microfluidic chip; and
a Laser-Induced Breakdown Spectroscopy (LIBS) module configured to irradiate a second point of the microfluidic chip with a laser,
wherein, when the generated droplet is detected in an image captured by the machine vision, the LIBS module is driven to irradiate the second point with the laser,
wherein the microfluidic chip is configured such that the generated droplet is observable at each of the first point and the second point, and
wherein the first point and the second point are separated by a predetermined distance, the predetermined distance being derived from at least one of a generation speed of the generated droplet or a movement speed of the generated droplet through the microfluidic chip.

2. The analysis device according to claim 1, wherein at least one of the first fluid or the second fluid contains oil.

3. The analysis device according to claim 1, wherein at least one of the first fluid or the second fluid contains crude oil.

4. The analysis device according to claim 1, wherein at least one of the first fluid or the second fluid contains moisture.

5. The analysis device according to claim 1, wherein the first point and the second point are located at a same point.

6. The analysis device according to claim 1, wherein at least one of the first point or the second point is located in the third flow path through which the generated droplet moves.

7. The analysis device according to claim 1, wherein the microfluidic chip further comprises a fine droplet channel, and
wherein at least one of the first point or the second point is located in the fine droplet channel in which the generated droplet is accumulated.

8. The analysis device according to claim 1,
wherein at a first time point the generated droplet is located at the first point and the machine vision captures the image containing the generated droplet,
wherein at a second time point the generated droplet is located at the second point and the LIBS module irradiates the second point with the laser such that the droplet is irradiated.

9. The analysis device according to claim 8,
wherein the predetermined distance is further derived from at least one of an image processing time of the machine vision to capture and detect the generated droplet, a signal processing time of the machine vision or the LIBS module, a trigger signal transmitting time, or a laser emitting processing time of the LIBS module.

10. The analysis device according to claim 9, further comprising a microfluidic chip control unit configured to control at least one of the generation speed or the movement speed.

11. The analysis device according to claim 9, further comprising an image processing unit configured to determine whether the generated droplet is in an image captured by the machine vision and, upon determining that the generated droplet is in the image, generate a trigger signal.

12. The analysis device according to claim 11, further comprising a LIBS control unit configured to control the LIBS module to irradiate the second point with the laser upon receiving the trigger signal.

13. The analysis device according to claim 1, further comprising a microfluidic chip control unit configured to control a generation speed of the generated droplet and a movement speed of the generated droplet within the microfluidic chip.

14. The analysis device according to claim 1, further comprising an image processing unit configured to determine whether the generated droplet is in an image captured by the machine vision and, upon determining that the generated droplet is in the image, generate a trigger signal.

15. The analysis device according to claim 14, further comprising a LIBS control unit configured to control the LIBS module to irradiate the second point with the laser upon receiving the trigger signal.

16. An analysis device comprising:

a microfluidic chip configured to generate a plurality of droplets, and comprising:

a first fluid inlet configured to supply a first fluid to a first flow path;

a branch disposed at an end of the first flow path, the branch forming at least a first branch flow path and a second branch flow path configured to carry the first fluid;

a second fluid inlet configured to supply a second fluid to a second flow path;

a joining region disposed at an end of the first branch flow path, an end of the second branch flow path, and an end of the second flow path such that the plurality of droplets are generated by the first fluid and the second fluid joining at the joining region, the plurality of droplets comprising the second fluid; and a third flow path configured to carry the plurality of droplets;

a machine vision configured to capture images of a first point of the microfluidic chip, the images including a plurality of images that each capture a respective droplet of the plurality of droplets when the respective droplet is located at the first point; and a Laser-Induced Breakdown Spectroscopy (LIBS) module configured to irradiate a second point of the microfluidic chip with a laser, the second point being located such that the LIBS module is configured to irradiate a droplet of the plurality of droplets when the droplet is located at the second point, wherein the microfluidic chip is configured such that an individual droplet of the plurality of droplets is observable when the individual droplet is located at each of the first point and the second point, wherein the first point and the second point are located at a same point, wherein at a first time point a first droplet is located at a reference point on the microfluidic chip, the reference point being spaced away from the first point by a predetermined distance, and wherein the predetermined distance is derived from at least one of a generation rate of the plurality of droplets or a movement speed of the plurality of droplets through the microfluidic chip.

17. The analysis device according to claim 16, wherein at the first time point the machine vision captures a reference image of a second droplet of the plurality of droplets at the first point, and wherein at a second time point after the first time point the first droplet is located at the second point and the LIBS module irradiates the second point with the laser such that the first droplet is irradiated.

18. The analysis device according to claim 17, wherein the predetermined distance is further derived from at least one of an image processing time of the machine vision to capture and detect a droplet of the plurality of droplets, a signal processing time of the machine vision or the LIBS module, a trigger signal transmitting time, or a laser emitting processing time of the LIBS module.

19. The analysis device according to claim 18, further comprising:

an image processing unit configured to determine whether an individual droplet of the plurality of droplets is entirely observable in an image captured by the machine vision, and upon determining that the individual droplet is entirely observable in the image, generate a trigger signal; and a LIBS control unit configured to control the LIBS module to irradiate the second point with the laser upon receiving the trigger signal.

20. The analysis device according to claim 16, further comprising a microfluidic chip control unit configured to control at least one of the generation rate or the movement speed.

* * * * *